Patented Apr. 6, 1954

2,674,527

UNITED STATES PATENT OFFICE 2,674,527

HERBICIDAL COMPOSITIONS CONTAINING CHLORINATED ARYL ESTERS OF CHLORINATED ALIPHATIC MONOCARBOXYLIC ACIDS

Luther L. Baumgartner, Hastings-on-Hudson, N. Y., assignor to The B. F. Goodrich Company, New York, N. Y., a corporation of New York No Drawing. Application April 14, 1952,
Serial No. 282,268

8 Claims. (Cl. 71—2.3)

This invention relates to herbicidal compositions and more specifically pertains to herbicidal compositions containing as an essential active ingredient, a polychloroaryl ester of a chlorinated aliphatic monocarboxylic acid.

In my copending application Serial No. 147,754, filed March 4, 1950, now U. S. Patent No. 2,594,278, the herbicidal activity of compositions containing a polychloroaryl ester of an aliphatic monocarboxylic acid is disclosed. This application is a continuation-in-part of the above copending application.

I have discovered that when polychloroaryl esters of chlorinated aliphatic monocarboxylic acids are mixed with a mineral oil consisting predominantly of hydrocarbons containing from 10 to 20 carbon atoms such as kerosene and fuel oils, in concentrations as low as 0.01% by weight, the resulting compositions are exceedingly effective herbicides. These compositions are especially useful in killing a wide variety of grasses and broad leaf plants including varieties which are not controlled effectively with known herbicides. Mineral oil compositions containing the polychloroaryl esters in low concentrations of less than 1% by weight will kill broad leaf plants and some grasses while oil compositions containing the polychloroaryl esters in higher concentrations of 1% to 10% by weight can be employed to eradicate plant life of all kinds which is usually found in unpaved driveways, clay tennis courts, highway berms, vacant lots, drainage ditches, barn lots, along fence rows, in meadows and ranges. Plant life killed by such compositions includes species from such major families of the plant kingdom as Gramineae, Solanaceae, Cruciferae and Leguminosa and includes specifically such plant pests as for example wild aster, wild snapdragon, sour grass, golden rod, Queen Anne's lace, Canadian thistle, dandelion, cinquefoil, dock, Johnson grass, wild onion, pepper weed, annual blue grass, Dallas grass, smut grass, carpet grass, nut grass, burweed, ragweed, plantain, bindweed, lambsquarter, oxalis, foxtail, and shepherd's purse.

The polychloroaryl esters of chlorinated aliphatic monocarboxylic acids utilized as active ingredients in this invention contain three or more nuclear attached chlorine atoms per benzene ring in the aryl group of the ester. When the aryl group of the ester contains alkyl substituents, one or more of the hydrogens of the alkyl group may also be replaced by chlorine atoms. Thus for example the ester can be a tri-, tetra- or pentachlorophenyl ester; a tetra-, penta-, hexa-, or heptachlorotolyl ester, a tri-, tetra-, penta-, hexa-, hepta-, octa-, or nonachloroxylyl ester, a tetra- to heptachloro naphthyl ester; as well as any of the cholorethylphenyl esters, chloroethyltolyl esters and chloropropylphenyl esters which contain 3 or more chlorine atoms attached to nuclear carbon atoms of the benzene ring. The acid portion of these active ingredients can be derived from the lower aliphatic acids such as formic, acetic, propionic, butyric acids or may be derived from such fatty acids as stearic acid and palmitic acid. The acid portion of these active ingredients may contain one or more chlorine atoms.

The preferred active ingredients for the composition of this invention are the pentachlorophenyl esters of chlorinated monocarboxylic acids having 1 to 6 carbon atoms in the acid residue of the ester and from 1 to 9 chlorine atoms attached to the carbon atoms of the acid residue.

The active ingredients of the compositions of this invention can be readily and conveniently prepared by methods well known to the art of organic chemical synthesis. For example, they can be prepared by reacting a polychlorinated phenolic compound with an acyl halide of a chlorinated monocarboxylic acid. The ester is formed through the splitting out of hydrogen chloride. Thus, when pentachlorophenol is, for example, reacted with phosgene, the product resulting from the splitting out of HCl is pentachlorophenyl chloroformate, one of the preferred active ingredients. Other methods of preparing the polyhaloaryl esters of chlorinated monocarboxylic acids are well known to the art.

As representative compounds of the preferred class of active ingredients there may be mentioned pentachlorophenyl chloroformate; pentachlorophenyl mono-, di- and tri-chloroacetates; pentachlorophenyl mono-, di-, tri-, tetra-, pentachloropropionates; pentachlorophenyl mono-, di-, tri-, tetra-, penta-, hexa-, and hepta-chlorobutyrates; pentachlorophenyl mono-, di-, tri-, tetra-, penta-, hexa-, hepta-, octa-, nona-chlorovalerates; and the chloro derivatives of pentachlorophenyl caproates, and the like where one, two, three, etc., up to all of the hydrogens of the aliphatic group of the acid portion of these compounds are replaced by chlorine atoms.

The mineral oil used as the carrier in the herbicidal compositions described herein may be any oil consisting predominantly of hydrocarbons, preferably paraffin hydrocarbons containing 10 to 20 carbon atoms. Such hydrocarbons generally possess a boiling point above 150° C. and a Saybolt viscosity below 200 seconds. Examples of such oils are kerosene, light paraffin base oil, diesel fuel oils, Bunker C fuel oil, and other similar hydrocarbon mixtures whether or not derived from petroleum. In general, the lighter petroleum fractions and especially kerosene are preferably employed in preparing spray compositions for use in temperate climates while the heavier higher molecular weight petroleum oils such as the diesel fuel oils are best suited for formulations to be used in the hotter climates.

Compositions consisting entirely of the polychloroaryl esters of chlorinated aliphatic monocarboxylic acids in a concentration between 0.01% and 10% by weight dissolved or dispersed in the carrier oil may be sprayed on plants to produce the herbicidal effect. If desired, however, the polychloroaryl esters can be first dissolved in a small amount of the oil and then the oil solution dispersed in water with the aid of a wetting or dispersing agent to produce an oil-in-water emulsion containing from 0.01% to 10% by weight of the polychloroaryl ester and an oil content of from 1% to 100% of that of the water, and the resulting emulsion sprayed on plant life. In either event I have found that the application of the compositions in amounts such as to provide as little as 1 to 20 pounds of the active ingredient per acre of sprayed area is sufficient to kill a great variety of undesirable weeds and grasses although, of course, lower rates of application of from 0.25 to 1.0 pound per acre or higher rates of application up to 50 pounds per acre of the active ingredient may be employed in some instances.

Suitable dispersing or wetting agents for the preparation of oil-in-water emulsion include those typified by the following general classifications: Sodium and potassium salts of fatty acids known as soft and hard soaps; salts of disproportionated abietic acid known as rosin soaps; salts of hydroxyaldehyde acids present in seaweed known as algin soaps; alkali-casein compositions; water-soluble lignin sulfonate salts; long-chain alcohols usually containing 10 to 18 carbon atoms; water-soluble salts of sulfated fatty alcohols containing 10 to 18 carbon atoms; water-soluble salts of sulfated fatty acid amides; water-soluble esters of sulfated fatty acids; water-soluble alkyl sulfonates having 10 to 18 carbon atoms in the alkyl group; water-soluble aryl sulfonates; water-soluble alkyl aryl sulfonates; water-soluble aralkyl sulfonates; water-soluble sorbitan mono-laurate, -palmitate, -stearate, and -oleate; quaternary ammonium alkyl halides; fatty acids saponified with amines and amino alcohols; and others. Dispersing or wetting agents of the above classes are sold under various trade names. Such products are sometimes pure compounds but generally are a mixture of compounds of the same class with some substance as a filler. When one or more of these dispersing agents are employed to prepare the herbicidal compositions described above, it usually will be necessary to use only from about 0.1% to about 5% by weight of the dispersing or wetting agent depending on the efficiency of the dispersing or wetting agent and the quantity of oil to be emulsified.

The following specific examples illustrate the herbicidal properties of the compositions containing polychloroaryl esters of chlorinated mono-carboxylic acids as the essential active ingredient.

EXAMPLE I

Herbicidal compositions containing various amounts of pentachlorophenyl mono- and trichloro acetates dissolved in insecticide grade kerosene were employed in the form of spray against plants representative of the various plant families to which numerous common weed varieties belong. A composition containing 0.1% of these pentachlorophenyl esters dissolved in kerosene gave a complete kill of radish, oats, beans, squash, cabbage and tomato plants.

The following are field tests made on numerous weeds growing under natural conditions.

EXAMPLE II

A large area of ground containing a freshly prepared seed bed was layed out in plots 4 feet by 5.5 feet. Five of these plots were sprayed at the rate of 5 pounds of pentachlorophenyl monochloroacetate per acre. The spray composition contained one pound of this ester for each twelve gallons of kerosene, about 1.3% by weight. Five other plots were sprayed at the same rate with a kerosene solution containing 1.3% by weight of pentachlorophenyl trichloroacetate. Five plots were left untreated as check plots. These treatments were carried out just as the first weed seedlings were breaking ground. The plots were left uncultivated for eight weeks. At the end of this period all weeds were cut off at ground level and the green weed weights for each test were accumulated. The total weight of weed growth for each test and for the check plots is tabulated below in Table I.

*Table I*

| Chemical | Total Weight of Weeds, grams |
|---|---|
| Untreated | 25,259 |
| Pentachlorophenyl Monochloroacetate | 3,682 |
| Pentachlorophenyl Trichloroacetate | 2,770 |

The above data further demonstrates the herbicidal properties of the compositions of this invention. Similar compositions containing 1.5% to 2% by weight and applied at the same rate give a complete kill.

The weeds present in the untreated plots included wild aster, sour grass, golden rod, Queen Anne's lace, rag weed, Canadian thistle, dandelion, cinquefoil, plantain and dock.

EXAMPLE III

Equal numbers, about 20–25, of each of five types of seeds: wheat, tomato, radish, grass and onion, were planted on top of soil in six-inch wide one-gallon-containers. One hundred cubic centimeters of a 0.25% aqueous emulsion or dispersion of the chemical compound to be tested were immediately poured on the surface of the soil. After 15 days, seeds in untreated containers used as controls had germinated and grown appreciably, while the results in the treated containers were as follows:

| Plant Variety | Pentachlorophenyl monochloroacetate | Pentachlorophenyl trichloroacetate |
|---|---|---|
| Wheat | 1 germinated | No germination. |
| Tomato | do | Do. |
| Radish | do | Do. |
| Grass | No germination | Do. |
| Onion | do | Do. |

The activity of specific polychlorphenyl esters of chlorinated aliphatic monocarboxylic acids has been illustrated in the above specific examples, but any of the other specific members of the preferred esters hereinbefore named will possess substantially the same activity as herbicides. The other members of the preferred group can be used against weed growth with substantially the same results as indicated in the specific examples.

Although I have disclosed specific examples of my invention, I do not desire or intend to limit myself solely thereto for as hitherto stated, the precise proportions of the ingredients used can be varied without departing from the spirit and scope of the invention as defined in the appended claims.

I claim:

1. A herbicidal composition which comprises as the essential active ingredient 0.01% to 10% by weight of a polychloroaryl ester of a chlorinated aliphatic monocarboxylic acid, said acid having from 1 to 6 carbon atoms and said polychloroaryl portion of the ester containing at least 3 chlorine atoms in the aryl nucleus and, as a carrier therefor, a mineral oil consisting predominantly of hydrocarbons containing 10 to 20 carbon atoms.

2. A herbicidal composition which comprises as the essential active ingredient 0.01% to 10% by weight of a pentachlorophenyl ester of a chlorinated aliphatic monocarboxylic acid, said acid having from 1 to 6 carbon atoms and, as a carrier therefor, a mineral oil consisting predominantly of hydrocarbons containing 10 to 20 carbon atoms.

3. A herbicidal composition which comprises as the essential active ingredient 0.01% to 10% by weight of pentachlorophenyl monochloroacetate, and a carrier therefor, a mineral oil consisting predominantly of hydrocarbons containing 10 to 20 carbon atoms.

4. A herbicidal composition which comprises as the essential active ingredient 0.01% to 10% by weight of pentachlorophenyl trichloroacetate and, as a carrier therefor, a mineral oil consisting predominantly of hydrocarbons containing from 10 to 20 carbon atoms.

5. The method of killing plant life which comprises applying to the plant life a composition containing a polychloroaryl ester of a chlorinated aliphatic monocarboxylic acid, said acid having from 1 to 6 carbon atoms and said polychloroaryl portion of the ester containing at least 3 chlorine atoms in the aryl nucleus, said ester being applied in a quantity sufficient to destroy the growth of undesirable plants.

6. The method of killing plant life which comprises applying to the plant life a composition containing a pentachlorophenyl ester of a chlorinated aliphatic monocarboxylic acid, said acid having from 1 to 6 carbon atoms, said ester being applied in a quantity sufficient to kill undesirable plant life.

7. The method of killing plant life which comprises applying to the plant life a composition containing pentachlorophenyl monochloroacetate in a quantity sufficient to kill undesirable plant life.

8. The method of killing plant life which comprises applying to the plant life a composition containing pentachlorophenyl trichloroacetate in a quantity sufficient to kill undesirable plant life.

References Cited in the file of this patent

UNITED STATES PATENTS

| Number | Name | Date |
|---|---|---|
| 2,188,734 | Carswell | Jan. 30, 1940 |
| 2,282,732 | Lean | May 12, 1942 |
| 2,390,941 | Jones | Dec. 11, 1945 |
| 2,393,086 | Bousquet | Jan. 15, 1946 |
| 2,550,049 | Eaker | Apr. 24, 1951 |

OTHER REFERENCES

"Agricultural Chemicals," June 1951, page 113.